United States Patent
Takagi et al.

(10) Patent No.: US 6,813,093 B2
(45) Date of Patent: Nov. 2, 2004

(54) LENS BARREL

(75) Inventors: Tetsuya Takagi, Akiruno (JP); Satoru Yasutomi, Hachioji (JP); Keita Takahashi, Tsukui-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/373,944

(22) Filed: Feb. 25, 2003

(65) Prior Publication Data

US 2003/0234986 A1 Dec. 25, 2003

(30) Foreign Application Priority Data

Feb. 27, 2002 (JP) ........................ 2002-051812
Feb. 27, 2002 (JP) ........................ 2002-051813

(51) Int. Cl.[7] ................................ G02B 15/14
(52) U.S. Cl. ........................ 359/700; 359/699
(58) Field of Search ....................... 359/699, 700, 359/701, 823

(56) References Cited

U.S. PATENT DOCUMENTS

| | | |
|---|---|---|
| 5,488,513 A | 1/1996 | Tanaka |
| 5,912,772 A | 6/1999 | Aoki |
| 6,487,025 B2 | 11/2002 | Koiwai et al. |
| 6,493,510 B2 | 12/2002 | Shimizu |
| 6,549,341 B2 | 4/2003 | Nomura et al. |
| 6,570,718 B2 * | 5/2003 | Nomura et al. ............ 359/699 |
| 2003/0072090 A1 * | 4/2003 | Yasutomi .................. 359/701 |
| 2003/0180036 A1 * | 9/2003 | Horiuchi et al. .......... 396/72 |

FOREIGN PATENT DOCUMENTS

| | | | |
|---|---|---|---|
| JP | 06067076 | 11/1994 | |
| JP | 09152542 A | * 6/1997 | ......... G02B/07/04 |
| JP | 10293239 | 11/1998 | |

* cited by examiner

Primary Examiner—Ricky Mack
(74) Attorney, Agent, or Firm—Volpe and Koenig, P.C.

(57) ABSTRACT

A lens barrel comprises a first frame and a second frame. A first female helicoid is formed in a first region on the inner circumference face of the first frame, and a second female helicoid is formed in a second region on the inner circumference face thereof with the same lead and a different groove depth from that of the first female helicoid. The second frame is disposed inside of the first frame, and a first male helicoid for spirally meshing with the first female helicoid, and a second male helicoid for spirally meshing with the second female helicoid, are formed on the outer circumference thereof. The second frame is linearly moved when rotated relative to the first frame.

24 Claims, 11 Drawing Sheets

LENS BARREL

This application claims benefit of Japanese Application No. 2002-51812 filed on Feb. 27, 2002, in Japan, and No. 2002-51813 filed on Feb. 27, 2002, in Japan, the entire contents of both of which are hereby incorporated by reference.

BACKGROUND OF THE INVENTION

1. Field of the Invention

The present invention relates to a lens barrel.

2. Description of the Related Art

A conventional lens barrel shown in a vertical sectional view in FIG. 10 has been known as a lens barrel having a cam frame which can be rotationally and linearly moved, and a lens frame which can be linearly driven by the cam frame. A conventional lens barrel 50 comprises, a fixed frame 51, a cam frame 52, a first group frame (described hereafter as the first group frame) 53 holding first group lenses 65, a second group frame (described hereafter as the second group frame) 54 which slidably supports a lens frame 59 holding second group lenses 66, a third group frame (described hereafter as the third group frame) 55 holding third group lenses 67, and a straight float key 56.

Note that, with the second group frame 54, shutter blades 68 are mounted thereto, and a blade suppressor 58, which is a suppression member for the shutter blades 68, is mounted thereto. A compression spring 57 is inserted between the blade suppressor 58 and the third group frame 55 for preventing linear movement play.

With the cam frame 52, a male helicoid 52a, which spirally meshes with a female helicoid 51a of the fixed frame 51, is provided on the outer circumference of the back end thereof, and furthermore, the female helicoid 52b and two pairs of cam grooves 52c and 52d are provided at the inner circumference portion thereof, and a bayonet groove 52h, which is an inner groove for holding the straight float key 56, are provided on the back end of the inner circumference portion thereof. Note that the female helicoid 52b and two pairs of the cam grooves 52c and 52d are disposed such that the helicoid and the cam grooves cross one another as shown in a development of the inner circumferential face of the cam frame in FIG. 11 which will be described later.

With the first group frame 53, a male helicoid 53a which spirally meshes with the female helicoid 52b of the cam frame 52 is provided on the outer circumference portion of the back end thereof. With the second group frame 54, a cam follower 62, which is freely slidably fitted into the cam groove 52d of the cam frame 52, is implanted (supported in a fixed manner) on the outer circumference portion thereof. With the third group frame 55, a cam follower 61 which is freely slidably fitted into the cam groove 52c of the cam frame 52 is implanted (supported in a fixed manner) on the outer circumference thereof. With the straight float key 56, a protruding straight key 56b which is freely slidably fitted into a straight guide groove 51b of the fixed frame 51, and a bayonet tab 56a which is freely slidably fitted into the bayonet groove 52h of the cam frame 52, are provided.

With the lens barrel 50 having a linear driving mechanism described above, upon the cam frame 52 being rotationally driven by the lens barrel linear driving unit, the cam frame 52 is linearly moved while rotating. The straight float key 56 is linearly moved along the direction of the optical axis O along with the rotationally moving cam frame 52 without rotational movement. The first group frame 53, the second group frame 54, and the third group frame 55 are linearly driven, respectively, according to the rotational movement and linear movement of the cam frame 52 with the rotational movement being restricted by the straight float key 56.

Detailed description will be further made regarding the configuration of the inner circumference portion of the cam frame 52 with reference to FIG. 11 through FIG. 13. FIG. 11 is a development which illustrates an inner circumference face of the cam frame, FIG. 12 is a sectional view taken along line XII—XII of FIG. 11, and FIG. 13 is a diagram which illustrates the bayonet tab of the cam frame 52 and the insertion portion for the cam follower, as viewed from the back end side.

As shown in FIG. 11, with the inner circumference face of the cam frame 52, the female helicoid 52b with a predetermined lead, and three pairs of the cam grooves 52c and 52d are provided, and a bayonet groove 52h is provided at the back end face side. Furthermore, six notch-shaped inserting portions 52e for inserting the bayonet tab 56a, and three notch-shaped inserting portions 52f and 52g for inserting the cam followers 61 and 62, are provided on a ring-shaped back end wall portion 52j on the back end face where the bayonet groove 52h of the cam frame 52 is provided, respectively, as shown in FIG. 13. The cam followers 61 and 62 are fitted into the cam grooves 52c and 52d through the inserting portions 52f and 52g. The bayonet tab 56a is fitted into the bayonet groove 52h through the inserting portion 52e. Note that the inner diameter of the inner circumference face 52i (see FIG. 13) of the cam frame 52 is the same as the inner diameter of the back end wall portion 52j.

The female helicoid 52b of the cam frame 52 has a thread height (depth) H0 from the inner circumference face 52i. The male helicoid 53a of the first group frame 53 which spirally meshes with the female helicoid 52b also has the same thread height (depth) H0. The cam grooves 52c and 52d of the cam frame 52 have a groove depth C0 from the inner circumference face 52i. The minimal wall thickness of the circumference portion of the cam frame 52 is represented by t0. The thickness d0 from the outer circumference face up to the inner circumference face 52i where the cam grooves are provided is C0+t0.

The total wall thickness (required frame thickness) T0 of the cam frame 52 in the radial direction is a thickness wherein the thread height H0 of the female helicoid 52b and the thickness d0 from the outer circumference face up to the inner circumference face 52i of the cam groove are added. That is to say, the total wall thickness T0 in the radial direction T0 is represented by $$T0=H0+d0.$$

Substituting the above-described d0=C0+t0, the following expression is obtained.

$$T0=H0+C0+t0 \qquad (1)$$

Note that a zoom lens barrel according to conventional art has been disclosed in Japanese Unexamined Patent Application Publication No. 6-67076, which employs a linear driving mechanism wherein the helicoid and the cam groove are disposed on the inner circumference face of the cam frame so as to cross one another, as with the conventional lens barrel shown in FIG. 10 described above.

With the above-described conventional lens barrel 50 shown in FIG. 10, while the cam grooves 52c and 52d, and the female helicoid 52b are disposed so as to cross one another, these are disposed in a pattern separated one from another. Accordingly, the total wall thickness (required frame thickness) T0 in the radial direction of the cam frame 52 with the minimal wall thickness t0 is obtained by simply adding the thread height H0 and the thickness d0 up to the outer face from the inner face.

SUMMARY OF THE INVENTION

A lens barrel according to the present invention comprises a first frame and a second frame. With the first frame, a first female helicoid is formed on the first region on the inner circumference face thereof, and a second female helicoid is formed with the same lead as the first female helicoid and a different groove depth from that of the first female helicoid on the second region in the inner circumference face thereof. The second frame is disposed inside of the first frame, and a first male helicoid which spirally meshes with the first female helicoid, and a second male helicoid which spirally meshes with the second female helicoids, are formed on the outer circumference thereof. The second frame is relatively rotated with respect to the first frame so as to be linearly driven.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

Description will now be made regarding embodiments according to the present invention with reference to the drawings.

Figure 1:
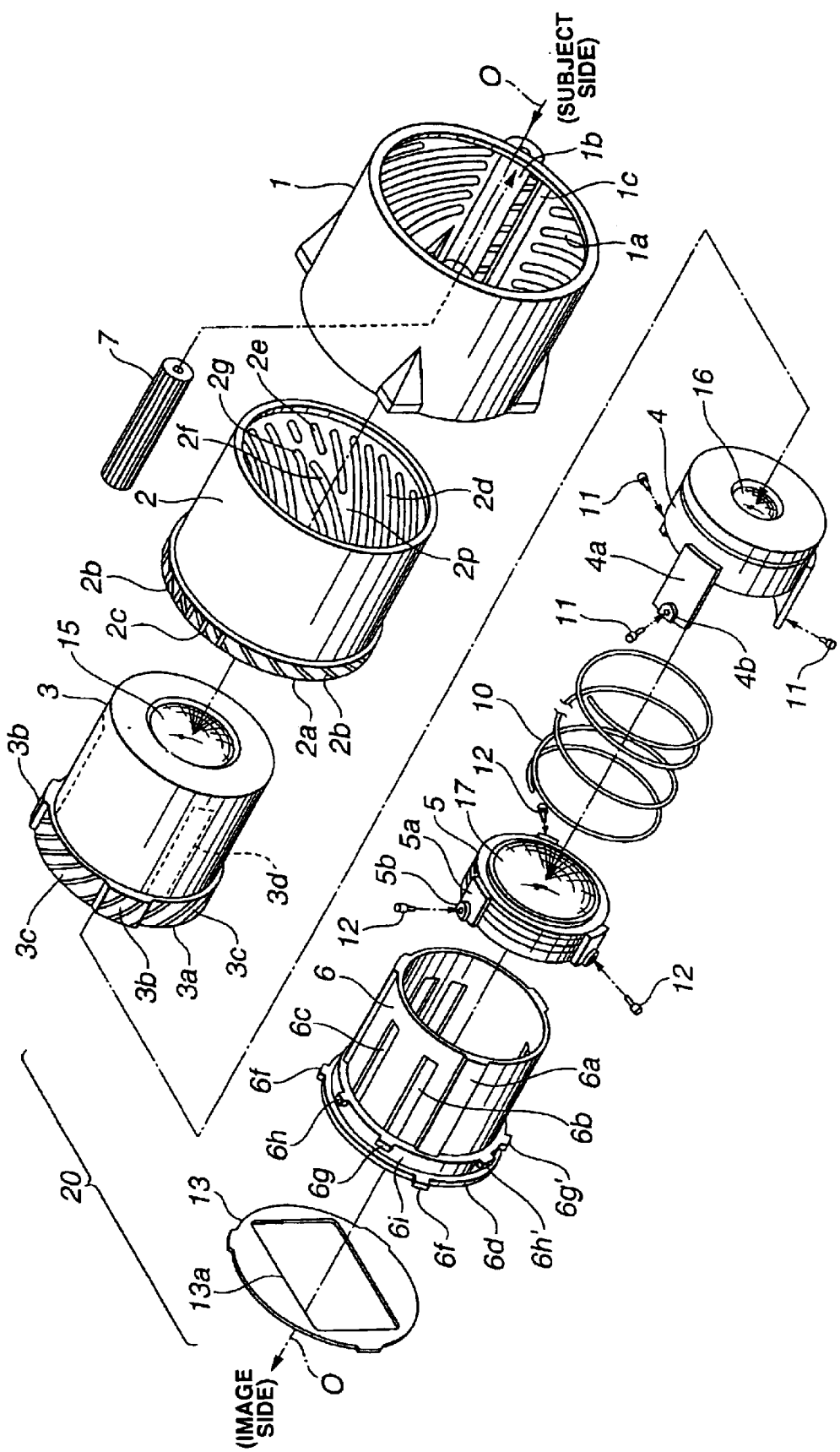
FIG. 1 illustrates an example of a lens barrel according to the present invention, and is an exploded perspective view which illustrates an overall configuration of the lens barrel frames.
Figure 2:
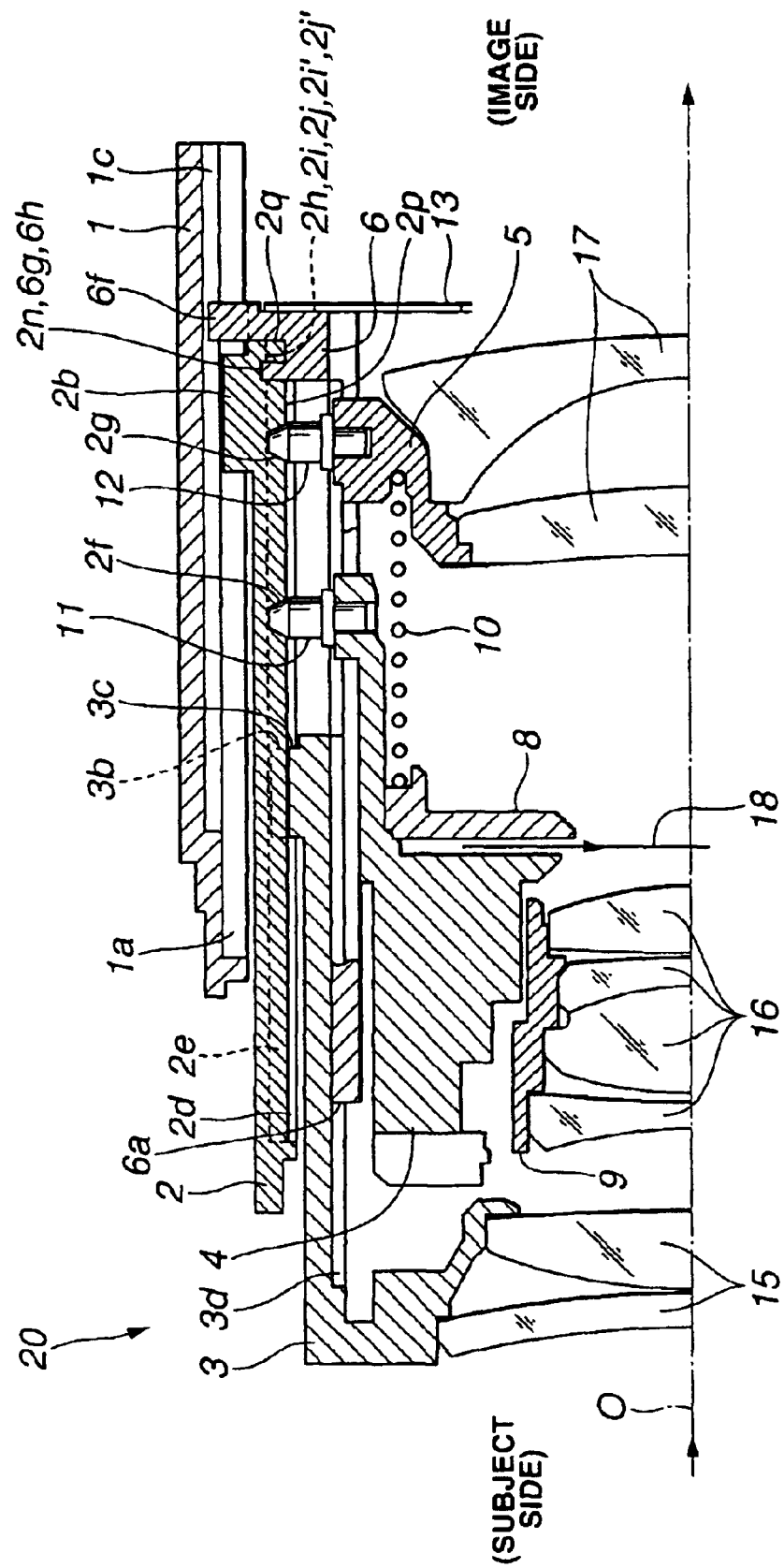
FIG. 2 is a longitudinal sectional view which illustrates the lens barrel shown in FIG. 1.
Figure 3:
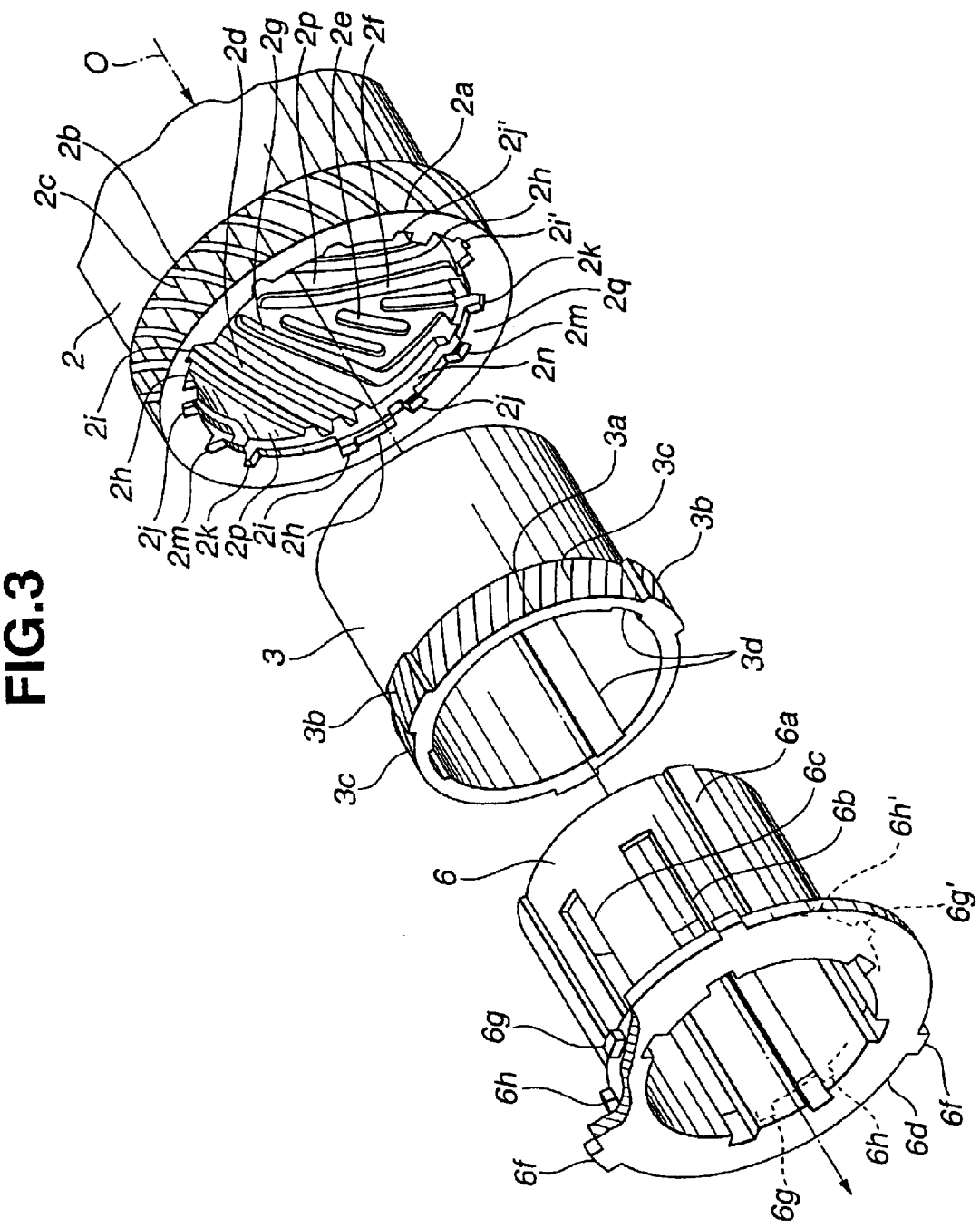
FIG. 3 is an exploded perspective view which illustrates principal components of the cam frame, the first group frame, and the straight float key, of the lens barrel shown in FIG. 1.

FIG. 1 is an exploded perspective view illustrating a lens barrel which is an embodiment of the present invention, and FIG. 2 is a vertical sectional view illustrating the lens barrel. FIG. 3 is an exploded perspective view illustrating a cam frame which is mounted on the lens barrel, a first group frame, and a straight float key, as viewed from the image side.

Description will now be made taking the subject side with respect to the lens barrel as the forward side, and the image side thereof as the backward side. The optical axis of lenses comprising a first lens group, second lens group, and third lens group, will be referred to as the axis O. The rotational direction on the optical axis O is shown with the rotational direction as viewed from the subject side.

As shown in FIG. 1 and FIG. 2, a lens barrel 20 of an embodiment according to the present invention comprises a fixed frame 1 which is supported being fixed to a camera main unit or the like, a cam frame 2 which is a first frame that is fitted into the fixed frame 1, and is rotationally and linearly moved, a first group frame (described hereafter as the first group frame) 3 which is a second frame that is fitted into the cam frame 2, and is linearly moved in the optical direction O, a second group frame (described hereafter as the second group frame) 4 and a third group frame (described hereafter as the third group frame) 5, which are the third frames that are fitted into the first group frame 3 and are linearly moved, and a straight float key 6 which is a straight guide member that is linearly moved along the direction of the optical axis O.

Furthermore, the lens barrel 20 comprises a compression spring 10 disposed between the second group frame 4 and the third group frame 5, a blade suppressor 8 supported by the second group frame 4, shutter blades 18 supported by the second group frame 4, a focus frame 9 slidably supported by the second group frame 4, a flare diaphragm 13 held by the straight float key 6, a long cam frame driving gear 7 for transmitting rotational driving force from an unshown lens barrel driving unit to the cam frame 2, and a first, second, and third group lenses 15, 16, and 17, which are multiple photography lenses held by the first group frame 3, focus frame 9, and third group frame 5, respectively.

The fixed frame 1 is a cylindrical member, and a female helicoid (helicoid screw) 1a, three straight grooves 1c extending along the direction of the optical axis O, and a recess-shaped gear box 1b extending along the direction of the optical axis O are provided to the inner circumference portion thereof. Note that the long cam frame driving gear 7 is freely rotatably mounted in the gear box 1b.

The cam frame 2 is a cylindrical member, and a male helicoid (helicoid screw) 2b which spirally meshes with the female helicoid 1a of the fixed frame 1 and a gear portion 2c which meshes with the cam frame driving gear 7 are provided to the ring-shaped outer circumference portion 2a with a predetermined width on the backward side thereof in a overlapped manner. Three units of first female helicoids (helicoid screws) 2d which have the same lead and the deep thread height (standard thread shape), three units of second female helicoids (helicoid screws) 2e with the thread height being relatively small, three each of second group cam grooves 2f and third group cam grooves 2g which are disposed so as to cross the second female helicoids 2e, are provided to the inner circumference face 2p of the cam frame 2 (see FIG. 4).

Moreover, as notch-shaped inserting portions for inserting the thread portion of the helicoid, the bayonet tab and cam follower into the cam frame 2, a helicoid inserting portion 2h, bayonet tab inserting portions 2i and 2i' which are the first tab inserting portions, bayonet tab inserting portions 2j and 2j' which are the second tab inserting portions, and a second and third group cam follower inserting portions 2k and 2m, are disposed on the ring-shaped back end wall portion 2q which is one end portion along the inner face with the same diameter as the inner circumference face 2p on the back end face of the cam frame 2. Also, a bayonet groove 2n which is a guide portion is provided along the inner circumference inside of the back end wall portion 2q. Note that the bayonet groove 2n is a groove wherein bayonet tabs 6g, 6g', 6h, and 6h' of the straight float key 6 are fitted thereinto, and are rotationally moved.

The cam frame 2 is fitted into the inner circumference portion of the fixed frame 1, and upon rotationally driven by the cam frame driving gear 7 through the gear portion 2c, the cam frame 2 is linearly moved along the direction of the optical axis O while being rotated by the female helicoid 1a and the male helicoid 2b.

Description will be made later regarding the structures and the disposed positions of the first and second female helicoids 2d and 2e, the second and third group cam grooves 2f and 2g, inserting portions 2h, 2i, 2j, 2i', 2j', 2k, 2m, a bayonet groove 2n, and the like.

The first group frame 3 is a cylindrical member, and first male helicoids 3b (three portions) and second male helicoids 3c (three portions) are provided to the ring-shaped outer circumference portion 3a with a predetermined width on the backward side thereof. Three straight grooves 3d are provided to the inner circumference portion of the first group frame 3 along the direction of the optical axis O. The first male helicoids 3b are helicoid screws with a high thread height which spirally meshes with the first female helicoids 2d of the cam frame 2, and the second male helicoids 3c are helicoid screws with a low thread height which spirally meshes with the second female helicoids 2e of the cam frame 2. Note that while both first and second helicoids 2d and 2e transmit rotational driving force, in particular, the first female helicoid 2d also has a function of preventing the spirally meshed state from being disengaged under external force such as impact or the like, and the second female helicoid 2e also has a function of preventing light leakage from the void at the fitting portion.

The first group frame 3 is freely slidably supported in the direction of the optical axis O on the outer circumference of the straight float key 6 by the straight guide protrusion portion 6a fitted into the straight groove 3d, and is linearly driven by the first and second female helicoids 2e and 2d of the cam frame 2.

The second group frame 4 is a cylindrical member, and has three extending portions 4a along the direction of the optical axis O on the outer circumference portion thereof. A guide protrusion 4b is provided to each of three extending portions 4a, and a cam follower 11 is implanted on each of three guide protrusions 4b, respectively. The cam followers 11 are freely slidably fitted into the second group cam grooves 2f of the cam frame 2, and the guide protrusions 4b are freely slidably fitted into a straight guide groove 6b of the straight float key 6, which will be described later.

The second group frame 4 is freely slidably supported in the direction of the optical axis O by the straight guide groove 6b on the inner circumference portion of the straight float key 6, and is linearly driven by the second group cam groove 2f of the cam frame 2 through the cam followers 11.

The third group frame 5 is a disc-shaped member, and has three protrusions 5a on the outer circumference portion thereof. A guide protrusion 5b is provided to each of the three protrusions 5a, respectively, and a cam follower 12 is implanted on each of the three guide protrusions 5b, respectively. The cam followers 12 are freely slidably fitted into the third group cam groove 2g of the cam frame 2, and the guide protrusions 5b are freely slidably fitted into the straight guide groove 6c of the straight float key 6, which will be described later.

The third group frame 5 is freely slidably supported in the direction of the optical axis O by the straight guide groove 6c on the inner circumference portion of the straight float key 6, and is linearly driven by the third group cam groove 2g of the cam frame 2 through the cam followers 12.

The straight float key 6 is a cylindrical member, and three protruding straight keys 6f extending in the radial direction are provided to the outer circumference portion of a back end flange portion 6d thereof. Also, the three protruding bayonet tabs 6g and 6g' which are the first engaging portions, and the three protruding bayonet tabs 6h and 6h' which are the second engaging portions, with a height less than the outer circumference diameter of the back end ring portion 6d, are provided on an outer circumference portion 6i with a predetermined step and a predetermined forward distance from the back end flange portion 6d.

Furthermore, three straight guide protrusions 6a along the direction of the optical axis O on the cylinder unit and three straight guide grooves 6b and three straight guide grooves 6c, which are opened from the inner circumference side to the outer circumference, are provided to the straight float key 6 on the forward side from the outer circumference portion 6i.

Note that the straight key portions 6f are freely slidably fitted into the straight grooves 1c of the fixed frame 1. The bayonet tabs 6g and 6g', and the bayonet tabs 6h and 6h' are freely slidably fitted into the bayonet groove 2n of the cam frame 2, and connected bayonet-style. Accordingly, the straight float key 6 relatively rotates with respect to the cam frame 2, and is driven integrally in the direction of the optical axis O.

The compression spring 10 is disposed between the second group frame 4 and the third group frame 5 so as to constantly press force in the direction wherein the second and third group frames 4 and 5 are distanced one from another. The second and third group frames 4 and 5 are linearly moved with fitting play between each cam follower and each cam groove being removed while receiving the pressing force.

Next, detailed description will be made regarding the structures and positioning of the first and second female helicoids, the second and third group cam grooves, bayonet grooves, and inserting portions for the male helicoids, bayonet tabs, and cam followers, 2h, 2i, 2i', 2j, 2j', 2k, 2m, and the like, formed on the inner circumference face of the cam frame 2, with reference to FIG. 4 through FIG. 9.

Figure 4:
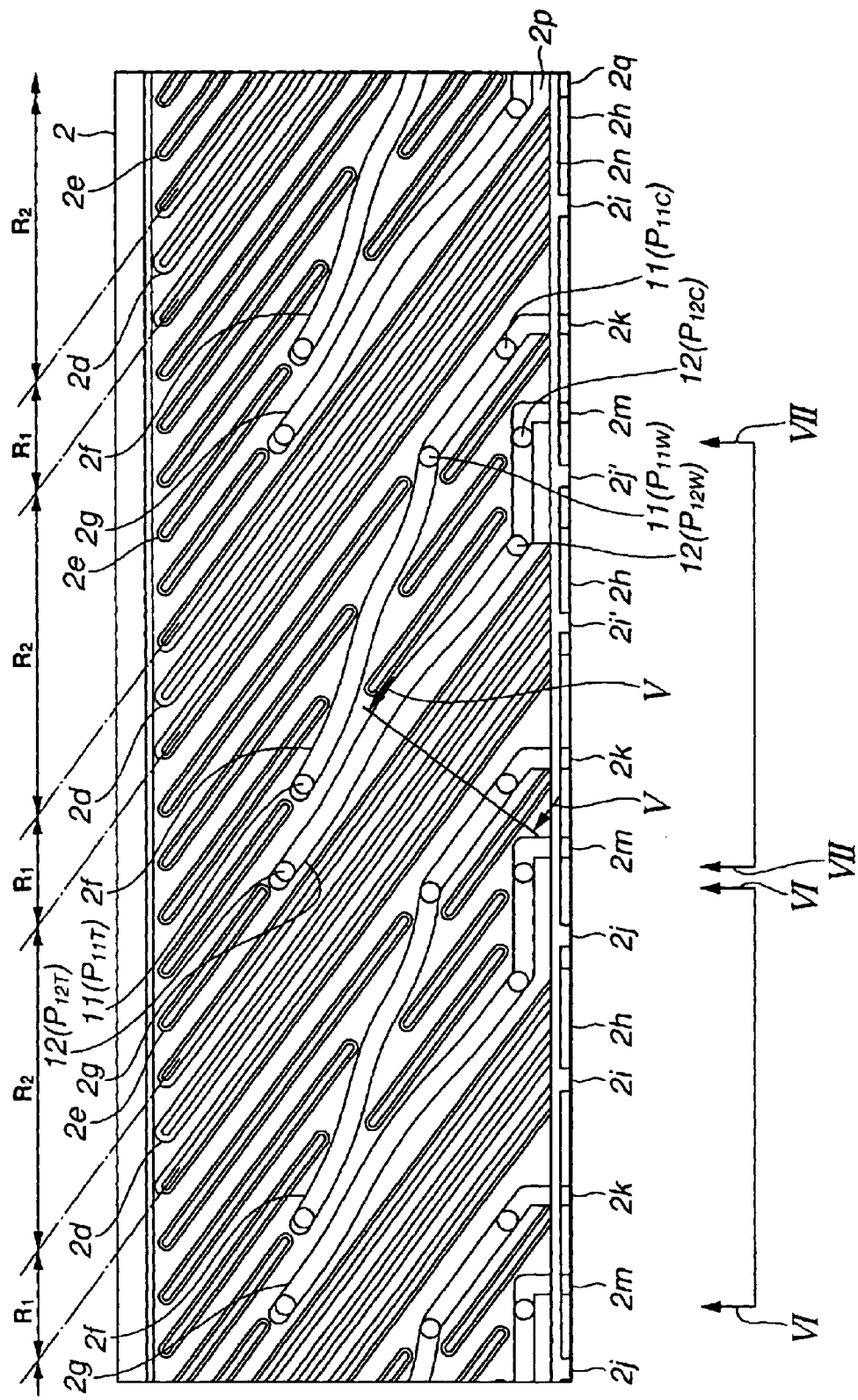
FIG. 4 is a development of the inner circumference face of the cam frame of the lens barrel shown in FIG. 1.
Figure 5:
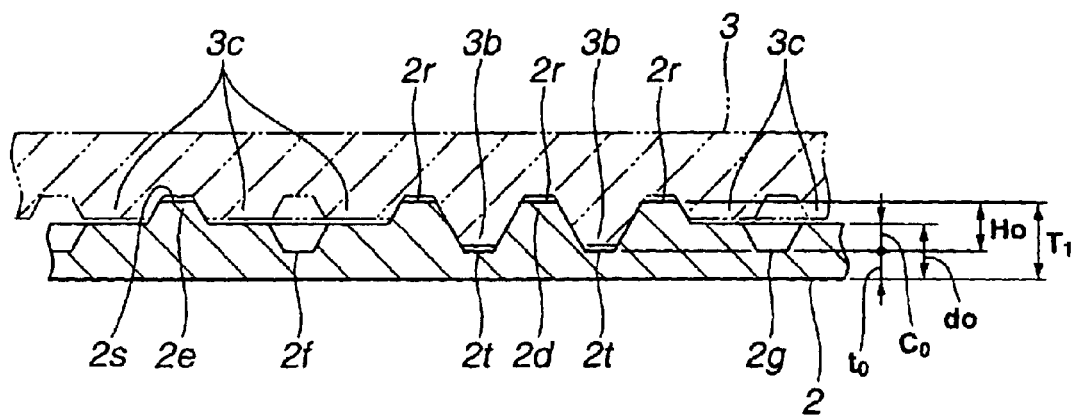
FIG. 5 is a sectional view taken along line V—V of FIG. 4.
Figure 6:
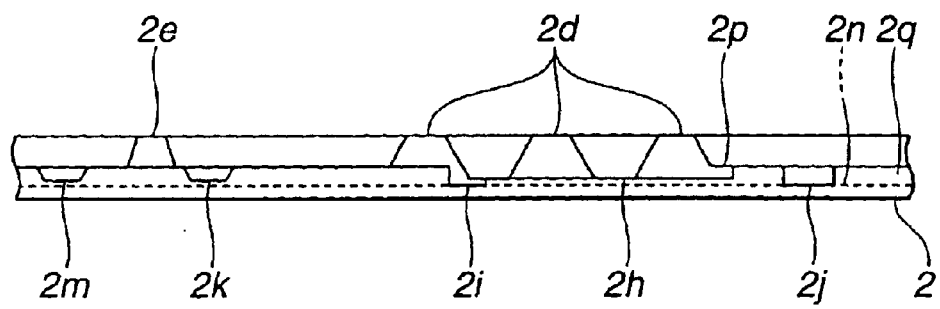
FIG. 6 is a view taken along the arrow VI—VI in FIG. 4.
Figure 7:
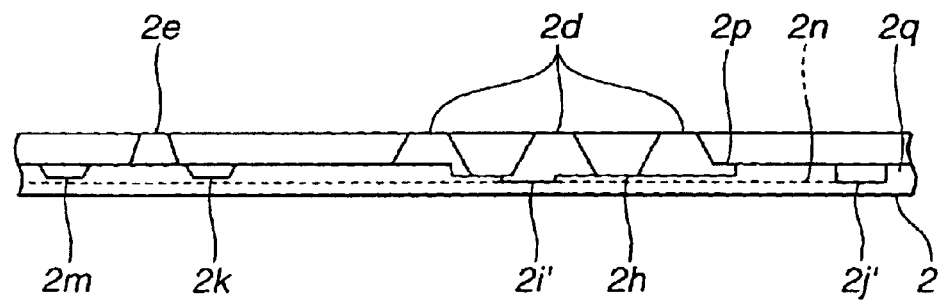
FIG. 7 is a view taken along the arrow VII—VII in FIG. 4.
Figure 8:
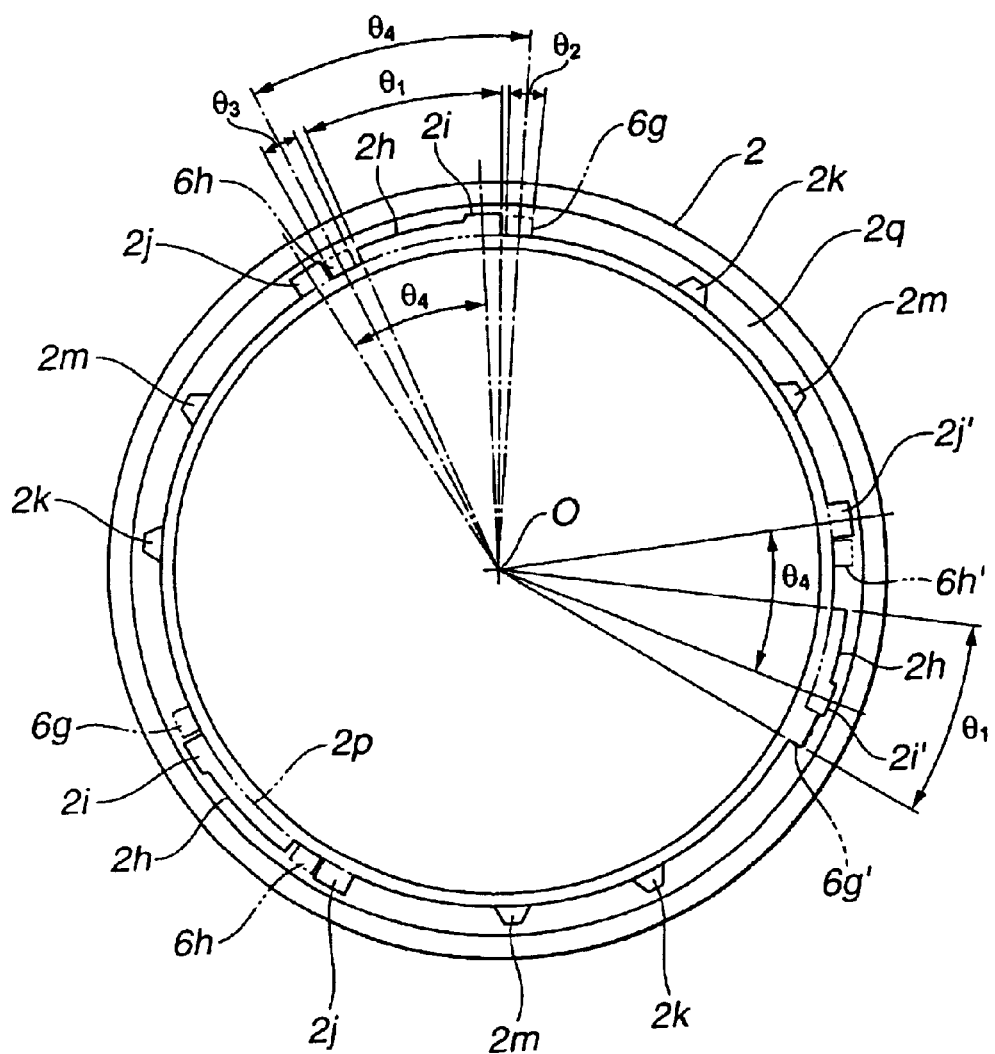
FIG. 8 is a diagram which illustrates the cam frame of the lens barrel shown in FIG. 1 as viewed from the image side, and is an explanatory diagram which illustrates the state immediately following the straight float key being inserted into the cam frame.
Figure 9:
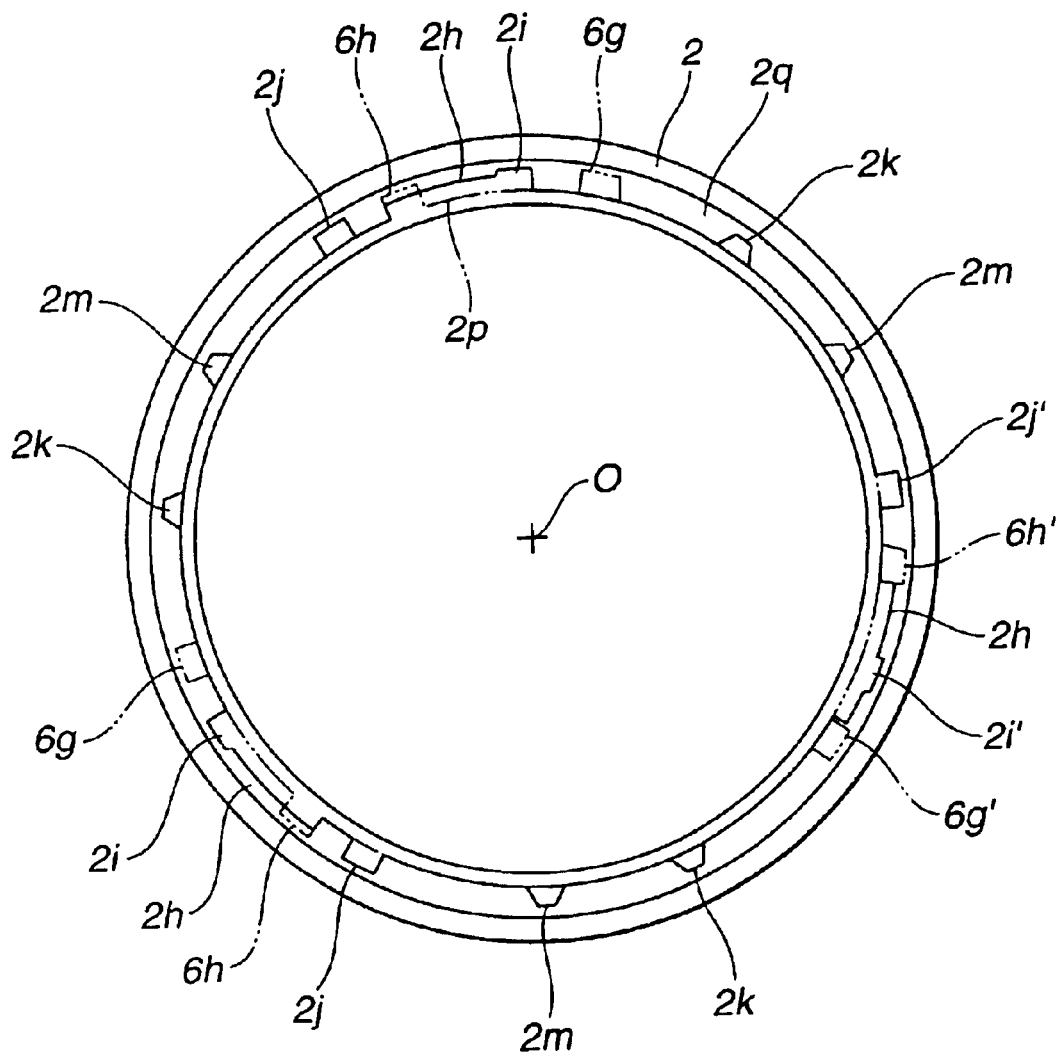
FIG. 9 is a diagram which illustrates the cam frame of the lens barrel shown in FIG. 1 as viewed from the image side, and is an explanatory diagram which illustrates the state wherein the straight float key is further relatively rotated from the state shown in FIG. 8.
Figure 10:
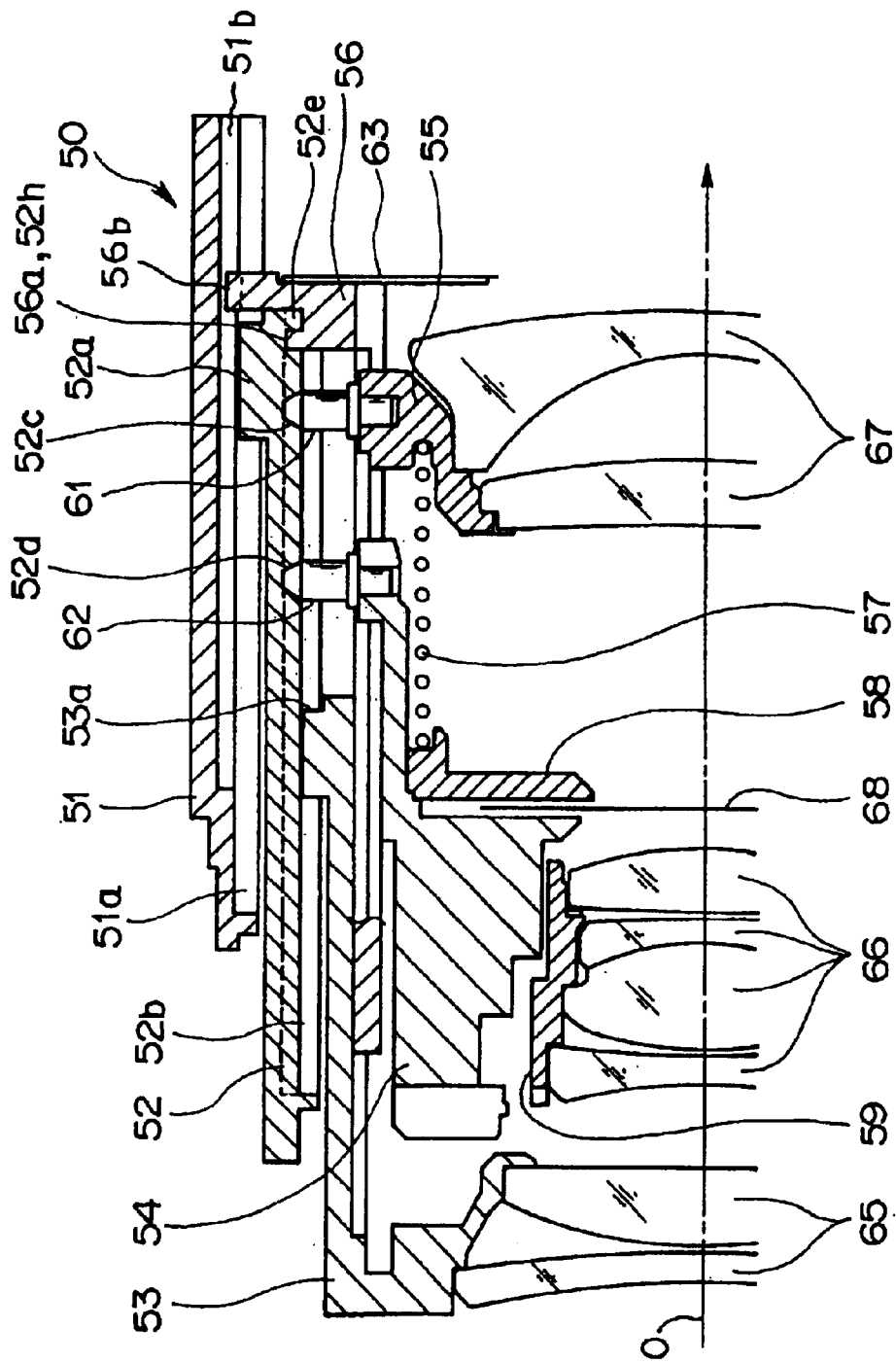
FIG. 10 is a longitudinal sectional view which illustrates a conventional lens barrel.
Figure 11:
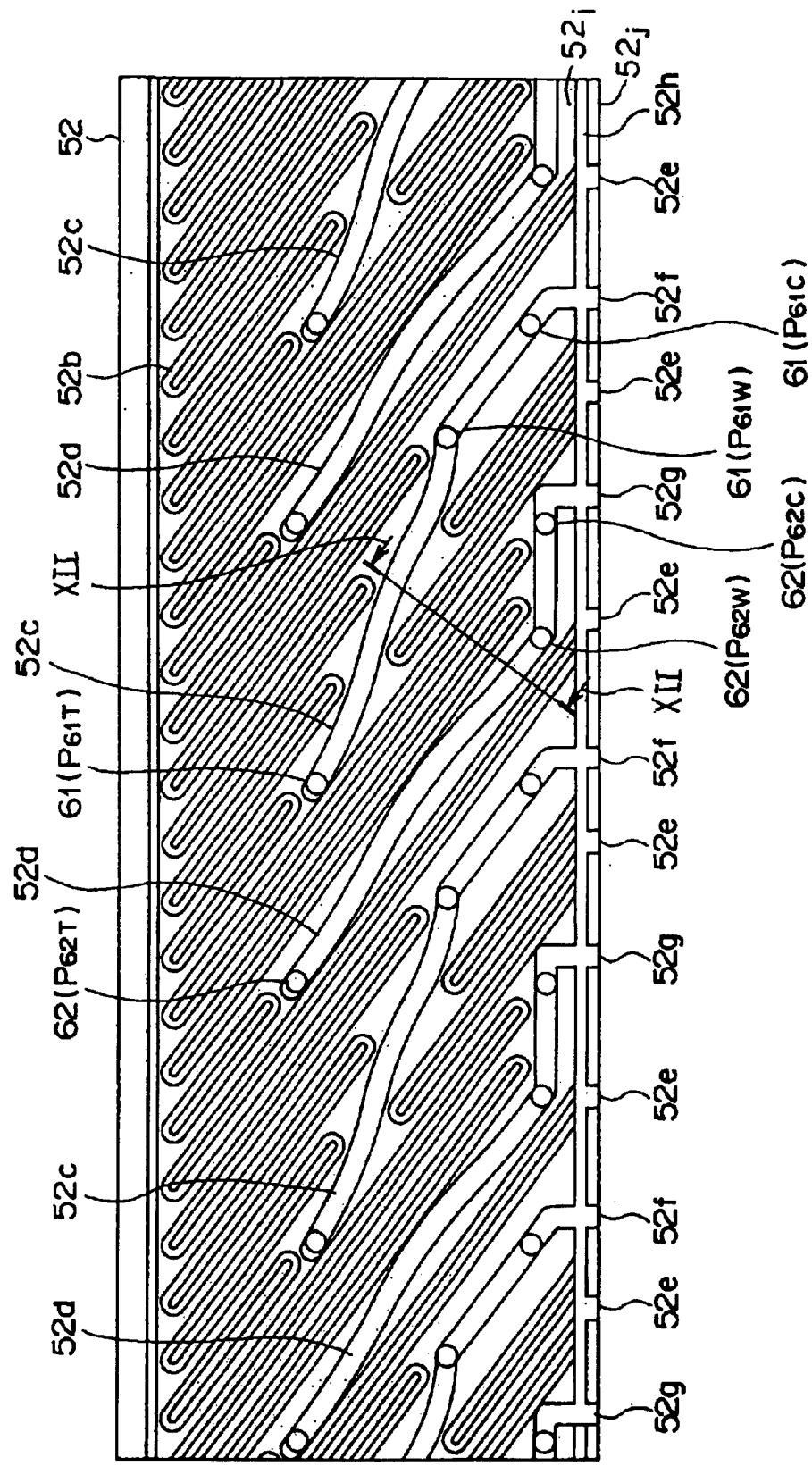
FIG. 11 is a development which illustrates the inner circumference face of the cam frame of the conventional lens barrel shown in FIG. 10.
Figure 12:
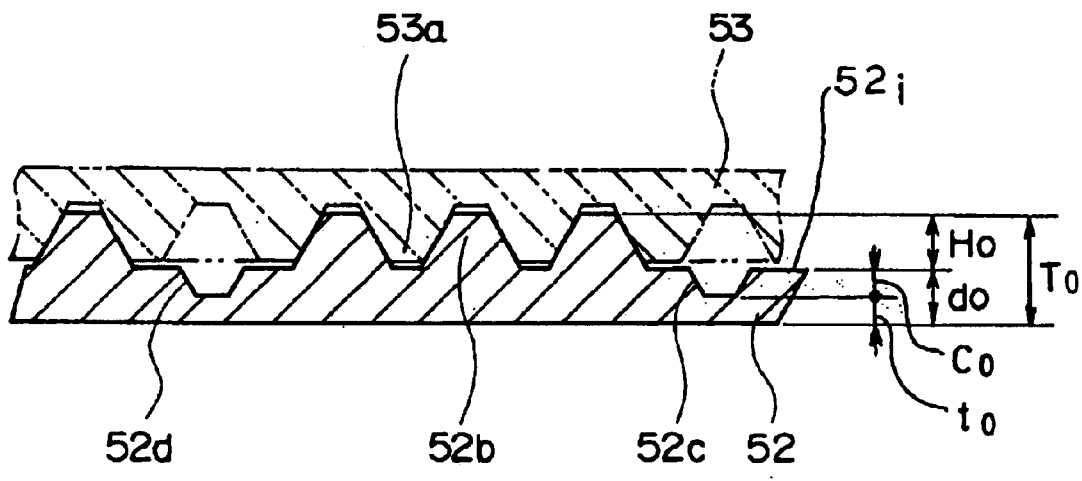
FIG. 12 is a sectional view taken along line XII—XII of FIG. 11.
Figure 13:
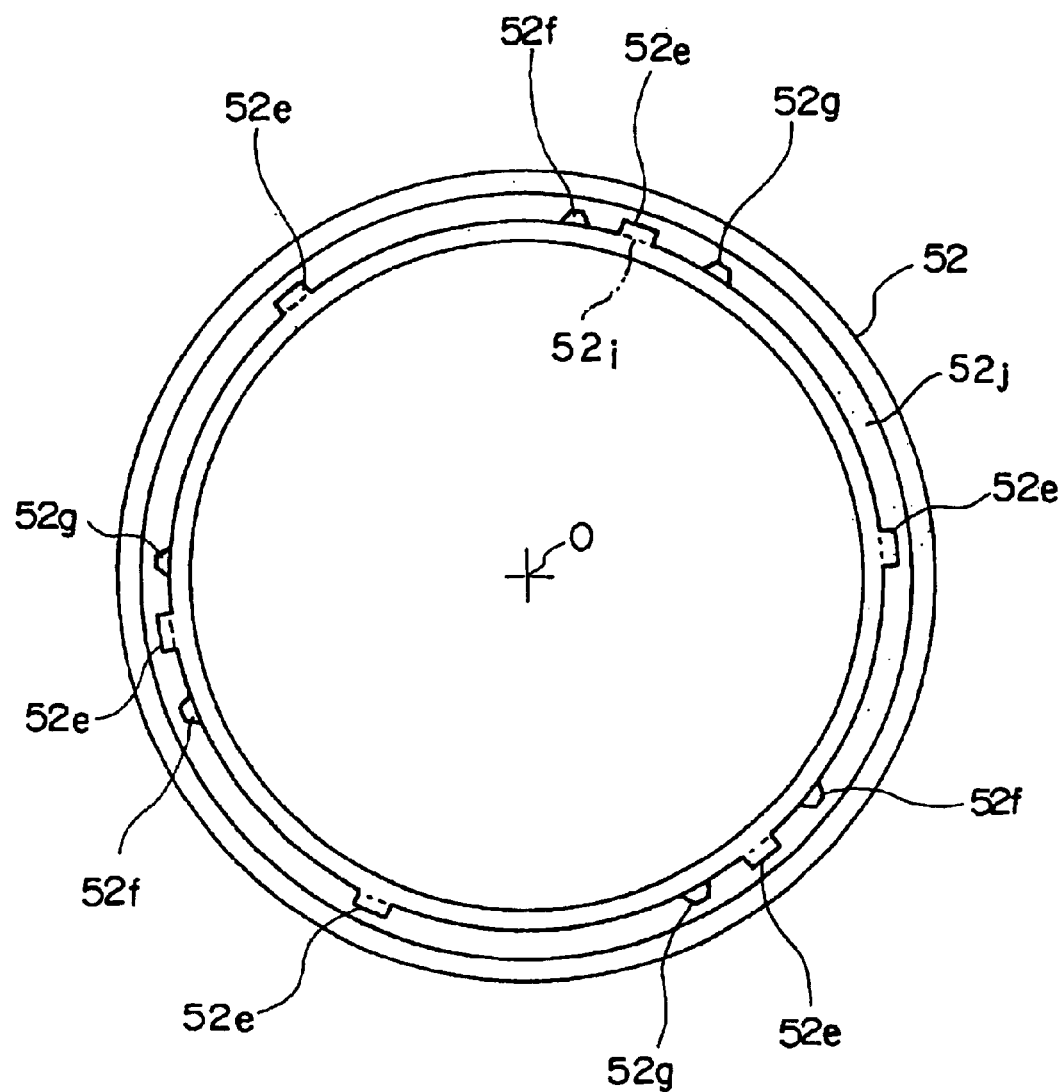
FIG. 13 is a diagram which illustrates the cam frame of the conventional lens barrel shown in FIG. 10 as viewed from the image side.

FIG. 4 is a development which illustrates an inner circumference face of the cam frame. FIG. 5 is a sectional view taken along line V—V in FIG. 4, FIG. 6 is a view taken along the arrow of line VI—VI in FIG. 4, and FIG. 7 is a view taken along the arrow of line VII—VII in FIG. 4. FIG. 8 and FIG. 9 are diagrams which illustrates the back end wall portion of the cam frame as viewed from the backward side (image side), and also illustrates the relative positions of the bayonet tabs of the straight float key. Note that there is a difference in the relative positions of the bayonet tabs between the state shown in FIG. 8 and the state shown in FIG. 9.

As shown in FIG. 4, three each of the first regions R1 and the second regions R2, which are separated one from another along the lead of the helicoid, are alternately provided on the inner circumference face 2p of the cam frame 2 which has a predetermined inner diameter size. The first region R1 is a region with a narrower width in the circumference direction than that of the second region R2, and is disposed at predetermined intervals. With the present embodiment, the first regions R1 and the second regions R2 are disposed at equal intervals so as to be disposed in a balanced manner.

The first female helicoids 2d are disposed on the first regions R1. The second female helicoids 2e, the second cam grooves 2f, and the third group cam grooves 2g are provided to the second regions R2, crossing each other. Note that the first and second female helicoids 2d and 2e have the same lead.

The shape of the helicoid lead vertical cross-sectional face (cross sectional face taken along line V—V in FIG. 4) of the first and second female helicoids 2d and 2e and the second and third group cam grooves 2f and 2g are shown in FIG. 5.

The second and third group cam grooves 2f and 2g are cam grooves with a groove depth of C0 provided on the inner circumference face 2p.

The first female helicoids 2d are formed along the inner circumference face 2p with the bottom portion 2t being on the circumference face with the same diameter as with the groove bottom face with a depth C0 of the cam grooves 2f and 2g. Let us say that the thread height H0 of the first female helicoid 2d from the bottom portion 2t up to the top portion 2r is the standard thread height size for helicoids applied to the arrangement.

The second female helicoids 2e are provided on the inner circumference face 2p, and the position of the bottom portion matches the inner circumference face 2p. The thread top portions 2s of the second female helicoids 2e and the thread top portions 2r of the first female helicoids 2d are on the circumference face with the same diameter. Accordingly, the thread height of the second female helicoids 2e from the bottom portion (which matches with the inner circumference face 2p) up to the thread top portion 2s is lower than the thread height H0 of the first female helicoids 2d by the cam groove depth C0, and accordingly is obtained as the size (H0−C0).

The minimal wall thickness t0 of the cam frame 2 in the radial direction is the size from the cam groove bottom face of the cam grooves 2f and 2g, or the bottom portion 2t of the first female helicoids 2d up to the outer circumference face. On the other hand, the total wall thickness (required frame thickness) T1 of the cam frame 2 in the radial direction is obtained as the size (H0+t0) obtained by adding the thread height H0 of the first female helicoids 2d and the above-described minimal wall thickness t0. That is to say, $$T1 = H0 + t0 \quad (2)$$

As shown in FIG. 5, the thread shape of the first and second male helicoids 3b and 3c of the first group frame 3 which spirally meshes with the first and second female helicoids 2d and 2e of the cam frame 2 are also the shape corresponding to the thread shape of the above-described first and second female helicoids 2d and 2e.

The back end wall portion 2q is provided on the back end side of the inner circumference face 2p of the cam frame 2 for disposing the bayonet groove 2n with a predetermined width and inserting portions along the inner circumference direction as shown in FIG. 4. Note that the diameter of the inner circumference face of the back end wall portion 2q matches with the diameter of the inner circumference face 2p.

The depth of the bayonet groove 2n is slightly deeper as compared with the cam grooves 2f and 2g and the bottom portion of the first female helicoids 2d on the inner circumference face 2p, and is a depth wherein the bayonet tabs 6g, 6g', 6h, 6h' of the straight float key 6 can be fitted thereinto.

As shown in FIG. 3 and FIG. 4, the cam follower inserting portions 2k and 2m, the helicoid inserting portion 2h, and the bayonet tab inserting portions 2i, 2i', 2j, 2j' are disposed on the back end wall portion 2q as notch-shaped inserting portions.

The cam follower inserting portions 2k and 2m are the cam follower inserting portions wherein three each cam followers 11 and 12 of the second and third group frames 4 and 5, which are disposed at positions facing the inserting opening side (back end side) of the second and third cam grooves 2f and 2g, can be inserted respectively therein.

The helicoid inserting portions 2h are three inserting portions into which the first male helicoids 3b of the first group frame 3 can be inserted, and are disposed at positions where the first female helicoids 2d of the first region R1 are extended to the back end side with the three positions dividing the back end side into three equal parts, with each of the inserting portions being notched portions with a required width of the first female helicoids 2d (the width of the first region R1).

The tab inserting portions 2i and 2j of the aforementioned bayonet tab inserting portions 2i, 2i', 2j, and 2j' are two pairs of four inserting portions (inserting openings) where two pairs of four bayonet tabs 6g and 6h of the straight float key 6 can be inserted. On the other hand, the tab inserting portions 2i' and 2j' are one pair of two inserting portions (inserting openings) where two bayonet tabs 6g' and 6h' of the straight float key 6 can be inserted. The aforementioned two bayonet tab inserting portions 2i and one bayonet tab inserting portion 2i' are disposed on the aforementioned helicoid inserting portions 2h which are disposed at the above-described positions dividing the back end side into three equal parts at equal intervals, in an overlapped manner.

Note that the relative positions of the bayonet inserting portions 2i and 2i' are offset one from another with respect to the helicoid inserting portions 2h as described later. Also, the depths of the bayonet tab inserting portions 2i, 2j, 2i', and 2j' are slightly deeper as compared with the helicoid inserting portions 2h corresponding to the form of the bayonet tabs 6g, 6h, 6g', and 6h' of the straight float key 6. Accordingly, in the event that the straight float key 6 is relatively rotated with respect to the cam frame 2, at a position where the bayonet tabs 6h, 6g', or 6h' within the helicoid inserting portions 2h is engaged with the helicoid inserting portions 2h by a small area, the bayonet tabs are readily disengaged, and furthermore, upon the bayonet tabs matching with the bayonet tab inserting portions 2i and 2i', the bayonet tabs might be disengaged.

Now, let us define the disposing interval angle θ4 for the bayonet tabs 6g and 6h such that the bayonet tabs 6g and 6h are not placed in the helicoid inserting portions 2h at the same time for preventing the two pairs of bayonet tabs 6g and 6h from falling out from the bayonet groove 2n due to relative rotation between the straight float key 6 and the cam frame 2. That is to say, the aforementioned disposing interval angle θ4 for the bayonet tabs 6g and 6h are determined according to the angle θ1 of the helicoid inserting grooves 2h (see FIG. 8).

With the tab width angles of the aforementioned bayonet tabs 6g and 6h as θ2 and θ3, respectively, the disposing interval angle θ4 for the bayonet tab inserting portions 2i and 2j is determined so as to satisfy the following expression, $$\theta 4 \geq \theta 1+(\theta 2/2)+(\theta 3/2) \quad (3)$$

With θ3=θ2. the aforementioned expression (3) is transformed into $$\theta 4 \geq \theta 1+\theta 2$$

Now, with the disposing interval angle θ4 as the narrowest angle, the expression is transformed into $$\theta 4 = \theta 1+\theta 2 \quad (4)$$

Thus, the disposing interval angle θ4 for the bayonet tab inserting portions 2i and 2j is determined so as to satisfy the expression (4).

On the other hand, with the disposing angle θ4 for the other one pair of bayonet tab inserting portions 2i' and 2j' is determined for preventing the bayonet tabs 6g' and 6h' from falling out from the bayonet groove 2n so as to satisfy the same expression (4) corresponding to the angle θ1 of the helicoid inserting portion 2h.

As described above, the two bayonet tab inserting portions 2i and one bayonet tab inserting portion 2i' are disposed at positions where relative positions are offset one from another on the helicoid inserting portions 2h disposed so as to divide the back end side into three equal parts, in a overlapped manner. Accordingly, when assembling, the fitting phase relationship between the cam frame 2 and the straight float key 6 is specified as shown in FIG. 8 and FIG. 9. The fitting phase properties allow the fitting phase of the first group frame 3, second group frame 4, and third group frame 5, in the rotational direction, not to differ from one individual product to another, thereby enabling the optical properties of the lens barrel to be stabilized. Moreover, assembling can be made with only a specific fitting phase, and accordingly error in assembling can be prevented.

Next, description will be made regarding one example of a procedure for assembling of the lens barrel 20 according to the present embodiment having the above-described configuration. Note that the cam frame 2 is connected to the fixed frame 1 in a helicoid manner, and is assembled therein, meshing with the cam frame driving gear 7.

Now, the first male helicoids 3b of the first group frame 3 are inserted from the helicoid inserting portions 2h of the cam frame 2 so that the cam frame 2 and the first group frame 3 spirally mesh with each other in a helicoid manner.

Next, the guide protrusions 4b and 5b of the second group frame 4 and the third group frame 5 are freely slidably inserted into the straight guide groove 6b and 6c of the straight float key 6, so that the second and third group frames 4 and 5 are assembled into the straight float key 6.

Subsequently, while inserting the straight guide protrusion 6a of the straight float key 6 into the straight groove 3d of the first group frame 3 fitted into the cam frame 2, the straight float key 6 is fitted into the inner circumference portion of the first group frame 3, and furthermore, the cam followers 11 and 12 of the second and third group frames 4 and 5 are inserted from the cam follower inserting portions 2k and 2m of the cam frame 2 so as to engage the second and third group cam grooves 2f and 2g of the cam frame 2. Subsequently, the bayonet tabs 6g, 6h, 6g' and 6h' of the straight float key 6 are inserted from the bayonet tab inserting portions 2i, 2j, 2i', and 2j' of the cam frame 2 so as to be engaged with the bayonet groove 2n. Moreover, the straight keys 6f of the straight float key 6 are fitted into the straight grooves 1c of the fixed frame 1 respectively, whereby assembling of lens barrel 20 is completed.

Now, description will be made regarding linear movement with regard to the lens barrel 20 according to the present embodiment described above. In the collapsed condition wherein all the frame members such as the cam frame 2 and the like are collapsed at the collapsed position, upon the cam frame 2 being rotationally driven by the cam frame driving gear 7, the cam frame 2 is risen from the collapsed position to the wide-angle position where photography can be made, and furthermore risen to the telephoto position, while rotating. The straight float key 6 is linearly risen along with the cam frame 2. The first group frame 3 is risen from the collapsed position to the wide-angle position where photography can be made, and furthermore risen to the telephoto position, with the rotation thereof being restricted by the straight float key 6, by the first and second male helicoids 3b and 3c which spirally mesh with the cam frame 2. Moreover, with the second and third group frame 4 and 5, the cam followers 11 and 12 are driven from the collapse corresponding position P11C and P12C to the wide-angle corresponding positions P11W and P12W, and furthermore to the telephoto corresponding positions P11T and P12T by the second and third cam grooves 2f and 2g (see FIG. 4), so that the second and third group frame 4 and 5 are also risen from the collapsed position to the wide-angle position where photography can be made, and furthermore risen to the telephoto position, with the rotation being restricted by the straight float key 6.

With the lens barrel 20 of the present embodiment having the configuration described above, the thread depth of the second female helicoids 2e provided on the cam frame 2 is reduced, and the second female helicoids 2e and the cam grooves 2f and 2g are disposed, crossing each other in the second region. Due to the positioning, the total wall thickness T1 of the cam frame 2 with the minimal thickness t0 in the radial direction of the cam frame 2 is obtained by (the height H0 of the first female helicoid 2d)+(the minimal thickness t0), and the aforementioned total wall thickness T1 which is a required frame thickness in the radial direction of the cam frame 2 can be made thinner, so the size of the lens barrel 20 can be reduced.

Note that with the conventional lens barrel 50 described above, the total wall thickness T0 of the cam frame 52 is obtained by (the height H0 of the female helicoid 52b)+(the depth C0 of the cam groove)+(the minimal thickness t0). The total wall thickness T1 of the cam frame 2 according to the present embodiment is thinner than the total wall thickness T0 of the cam frame 52 of the above-described conventional lens barrel by the depth C0 of the cam groove.

Furthermore, light leakage from the void at the fitting portion on the inner circumference face $2p$ on the second region of the cam frame 2 can be prevented by the second female helicoids $2e$. At the same time, even in the event of being subjected to external force, the risk that spiral-engagement might be disengaged is reduced due to the first female helicoids $2d$ having a high (deep) thread height.

Moreover, upon disposing the aforementioned two bayonet tabs $6g$ and $6h$, or $6g'$ and $6h'$ with the above-described angle $\theta 4$ therebetween, when one bayonet tab $6h$ or $6h'$ of the pair of bayonet tabs $6g$ and $6h$, or $6g'$ and $6h'$ provided to the straight float key 6 is placed in the bayonet tab inserting portion $2i$ or $2i'$ of the cam frame 2, another bayonet tab, $6g$ or $6g'$, is placed in the bayonet groove $2n$ other than the helicoid inserting portion $2h$. Accordingly, the bayonet tabs $6g$ and $6g'$ are prevented in a sure manner from being disengaged from the bayonet groove $2n$.

The present invention is not intended to be restricted to the above-described example; rather, various applications and combinations of the above-described example are encompassed in the scope of the present invention.

The invention being thus described, it will be obvious that the same may be varied in many ways. Such variations are not to be regarded as a departure from the sprit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A lens barrel comprising:
    a first frame wherein first female helicoid having a first depth is formed on a first region on an inner circumference face thereof, and a second female helicoid is formed with a same lead as the first female helicoid and a groove depth different from the first female helicoid on a second region in the inner circumference face thereof, and
    a second frame disposed inside of the first frame, wherein a first male helicoid which spirally meshes with the first female helicoid, and a second male helicoid which spirally meshes with the second female helicoids, are formed on the outer circumference thereof;
    wherein the second frame is linearly moved relative to the first frame when rotated relative to said first frame.

2. The lens barrel according to claim 1, further comprising:
    cam grooves formed on the second region of the first frame; and
    a third frame having cam followers for engaging the cam grooves;
    wherein the second frame and the third frame are moved relative the first frame along an optical axis direction when the first frame is rotate relative to the second frame and the third frame.

3. The lens barrel according to claim 2, wherein each cam is formed on substantially a same face as a bottom face of the second female helicoid in a thickness direction of the first frame, and a bottom face of the cam groove has a depth substantially the same as a death of a bottom face of the first female helicoid.

4. The lens barrel according to claim 1, wherein the first frame is provided with a plurality of first regions and second regions.

5. The lens barrel according to claim 4, wherein the first regions and the second regions are alternately disposed along the circumference direction of the first frame.

6. The lens barrel according to claim 5, having three (3) first regions and the three (3) second regions.

7. The lens barrel according to claim 1, wherein a width of the first region is narrower than that of the second region in the circumference direction.

8. The lens barrel according to claim 1, further comprising:
    a straight guide member supported so as to be relatively immovable with respect to the first frame along the optical direction and be rotationally movable along the optical axis;
    a first engaging tab provided on the straight guide member;
    a guide portion provided on the first frame for guiding the first engaging tab so as to enable the first engaging tab to move relative to the first frame and to rotate about the optical axis;
    a first tab inserting portion provided on one end portion of the first frame for inserting the first engaging tab into the guide portion; and
    a helicoid inserting portion provided on one end portion of the first frame for the first male helicoid to spirally mesh with the first female helicoid;
    wherein the first tab inserting portion is formed on the helicoid inserting portion.

9. The lens barrel according to claim 8, further comprising:
    a second engaging tab which is provided on the straight guide member, and is guided by the guide portion; and
    a second tab inserting portion provided at one end portion of the first frame for inserting the second engaging tab into the guide portion;
    wherein the second engaging tab is disposed at a position distanced by a predetermined distance with respect to the first engaging tab in a circumferential direction, and in the event that one of the first engaging tab and the second engaging tab is positioned at a position corresponding to the helicoid inserting portion in the circumference direction, the other is positioned at a position other than the helicoid inserting portion.

10. The lens barrel according to claim 9, wherein the first tab inserting portion, the second tab inserting portion, and the helicoid inserting portion, each consist of groove portions formed on one end portion of the first frame.

11. The lens barrel according to claim 10, wherein the groove depths of the first tab inserting portion and the second tab inserting portion are greater than the groove depth of the helicoid inserting portion.

12. The lens barrel according to claim 10, wherein the groove widths of the first tab inserting portion and the second tab inserting portion are narrower than the groove width of the helicoid inserting portion in the circumferential direction.

13. A lens barrel comprising:
    a first frame wherein a first female helicoid is formed on a first region on an inner circumferential face thereof, and a second female helicoid is formed with a lead which is the same as a lead of the first female helicoid and having a groove depth which is different than a groove depth of the first female helicoid in the second region; and
    a second frame disposed inside of the first frame, wherein a first male helicoid which spirally meshes with the first female helicoid, and a second male helicoid which spirally meshes with the second female helicoids, are formed on an outer circumference of said second frame;

wherein a top portion of a thread of the second helicoid is formed on a face which is substantially the same as a face of a top portion of a thread of the first female helicoid provided in a thickness direction of the first frame, and the second female helicoid is formed with a thread depth less than a thread depth of the first female helicoid.

14. The lens barrel according to claim 13, further comprising:
- a cam groove formed in the second region of the first frame; and
- a third frame having a cam follower for engaging the cam groove;
- wherein the first frame and the second frame are moved in the optical axis direction relative to the first frame when the first frame is rotated relative to the second and third frames.

15. The lens barrel according to claim 14, wherein the cam groove is formed on substantially the same face as a bottom face of the second female helicoid in a thickness direction of the first frame, and a bottom face of the cam groove has a depth substantially the same as a bottom face of the first female helicoid.

16. The lens barrel according to claim 13, wherein the first frame is provided with a plurality of first regions and second regions.

17. The lens barrel according to claim 16, wherein the first regions and the second regions are alternately disposed along a circumferential direction of the first frame.

18. The lens barrel according to claim 17, comprising three (3) first regions and three (3) second regions.

19. The lens barrel according to claim 13, wherein a width of the first region is narrower than a width of the second region measured in the circumferential direction.

20. The lens barrel according to claim 13, further comprising:
- a straight guide member supported so as to move together with the first frame along an optical direction and be free to rotate about the optical axis and relative to the first frame;
- a first engaging tab provided on the straight guide member;
- a guide portion provided in the first frame for guiding the first engaging tab so that it is free to rotate about the optical axis and relative to the first frame;
- a first tab inserting portion provided at one end portion of the first frame for inserting the first engaging tab into the guide portion; and
- a helicoid inserting portion provided at one end portion of the first frame for the first male helicoid spirally meshing with the first female helicoid;
- wherein the first tab inserting portion is formed on the helicoid inserting portion.

21. The lens barrel according to claim 20, further comprising:
- a second engaging tab which is provided on the straight guide member, and is guided by the guide portion; and
- a second tab inserting portion provided at one end portion of the first frame for inserting the second engaging tab into the guide portion;
- wherein the second engaging tab is disposed at a position distanced by a predetermined distance with respect to the first engaging tab in a circumferential direction, and in the event that one of the first engaging tab and the second engaging tab is positioned at a position corresponding to the helicoid inserting portion in the circumferential direction, the other is positioned at a position other than the helicoid inserting portion.

22. The lens barrel according to claim 21, wherein the first tab inserting portion, the second tab inserting portion, and the helicoid inserting portion, each comprise groove portions formed at one end portion of the first frame.

23. The lens barrel according to claim 22, wherein groove depths of the first tab inserting portion and the second tab inserting portion are greater than a groove depth of the helicoid inserting portion.

24. The lens barrel according to claim 22, wherein groove widths of the first tab inserting portion and the second tab inserting portion are narrow than a groove width of the helicoid inserting portion measured in the circumferential direction.

* * * * *

UNITED STATES PATENT AND TRADEMARK OFFICE
CERTIFICATE OF CORRECTION

PATENT NO. : 6,813,093 B2
DATED : November 2, 2004
INVENTOR(S) : Takagi et al.

It is certified that error appears in the above-identified patent and that said Letters Patent is hereby corrected as shown below:

Column 11,
Line 31, after the word "wherein", insert -- a --.
Line 53, after the word "relative", insert -- to --.
Line 54, after the word "is" delete "rotate" and insert therefor -- rotated --.
Line 60, delete "death" and insert therefor -- depth --.

Column 12,
Line 2, after the word "and", delete "the".

Column 14,
Line 39, after the word "are", delete "narrow" and insert therefor -- narrower --.

Signed and Sealed this

Fifteenth Day of February, 2005

JON W. DUDAS
*Director of the United States Patent and Trademark Office*